United States Patent
Strom et al.

(10) Patent No.: US 10,592,862 B1
(45) Date of Patent: Mar. 17, 2020

(54) TIMESTAMP-BASED SECURITY DEVICE REGISTRATION

(71) Applicant: Sennco Solutions, Inc., Plainfield, IL (US)

(72) Inventors: Stephen M. Strom, North Olmsted, OH (US); Joseph Ryan, III, Longmont, CO (US); Dale Liff, Montgomery, IL (US); Sean P. Behan, Yorkville, IL (US)

(73) Assignee: SENNCO SOLUTIONS, INC., Plainfield, IL (US)

( * ) Notice: Subject to any disclaimer, the term of this patent is extended or adjusted under 35 U.S.C. 154(b) by 0 days.

(21) Appl. No.: 16/177,856

(22) Filed: Nov. 1, 2018

(51) Int. Cl.
*G06Q 10/08* (2012.01)
*G08B 13/14* (2006.01)

(52) U.S. Cl.
CPC ....... *G06Q 10/087* (2013.01); *G08B 13/1409* (2013.01)

(58) Field of Classification Search
CPC .......................... G06Q 10/087; G08B 13/1409
See application file for complete search history.

(56) References Cited

U.S. PATENT DOCUMENTS

| | | | | |
|---|---|---|---|---|
| 7,626,500 | B2 * | 12/2009 | Belden, Jr. | E05B 45/005 340/568.1 |
| 10,339,496 | B2 * | 7/2019 | Matson | G06F 3/04842 |
| 2008/0097803 | A1 * | 4/2008 | Chirnomas | G06Q 10/06315 705/7.25 |
| 2008/0246613 | A1 | 10/2008 | Linstrom et al. | |
| 2009/0261977 | A1 | 10/2009 | Leone | |
| 2011/0309928 | A1 | 12/2011 | Henson et al. | |
| 2013/0168527 | A1 * | 7/2013 | Wheeler | A47F 7/024 248/542 |
| 2013/0181573 | A1 * | 7/2013 | Hines | H04L 25/02 310/313 R |
| 2013/0238516 | A1 | 9/2013 | Moock et al. | |
| 2013/0268316 | A1 | 10/2013 | Moock et al. | |
| 2014/0111337 | A1 * | 4/2014 | Taylor | G08B 13/1445 340/568.3 |
| 2014/0225733 | A1 | 8/2014 | Fawcett et al. | |
| 2015/0029027 | A1 | 1/2015 | Marin Villamayor et al. | |
| 2015/0077232 | A1 | 3/2015 | Grant et al. | |
| 2015/0235533 | A1 | 8/2015 | Grant et al. | |
| 2016/0140820 | A1 | 5/2016 | Joseph | |
| 2016/0283759 | A1 | 9/2016 | Forster | |

(Continued)

OTHER PUBLICATIONS

NFOA May 7, 2018, Non Final Office Action cited in corresponding U.S. Appl. No. 15/692,372; dated May 7, 2018; 14 pages.

*Primary Examiner* — Mohamed Barakat
(74) *Attorney, Agent, or Firm* — Lempia Summerfield Katz LLC

(57) ABSTRACT

A method of registering a security sensor device with a product device to be protected via the security sensor device includes obtaining sensor data identifying the security sensor device and including a sensor timestamp for an alteration in power delivery to the security sensor device, obtaining product data identifying the product device and including a product timestamp for an alteration in power delivery to the product device, implementing a comparison of the sensor timestamp and the product timestamp, and generating registration data for the security sensor device and the product device based on the comparison, the registration data associating the security sensor device and the product device.

20 Claims, 6 Drawing Sheets

(56) References Cited

U.S. PATENT DOCUMENTS

| | | |
|---|---|---|
| 2016/0307415 A1 | 10/2016 | Marszalek et al. |
| 2016/0308952 A1 | 10/2016 | Marszalek et al. |
| 2016/0343219 A1 | 11/2016 | Taylor et al. |
| 2017/0180314 A1* | 6/2017 | Walker .................... G06F 21/00 |
| 2019/0069728 A1* | 3/2019 | Alfarra ................... A47J 44/00 |

* cited by examiner

TIMESTAMP-BASED SECURITY DEVICE REGISTRATION

BACKGROUND OF THE DISCLOSURE

Field of the Disclosure

The disclosure relates generally to security devices for products on display.

Brief Description of Related Technology

Products are often displayed in retail environments with a security device. The security device prevents or deters theft while giving a consumer an opportunity to evaluate the product. The security device is often affixed to the product to help keep the product in a specific position in a display area. The security device nonetheless typically allows the consumer to lift or otherwise inspect the product to assess its function and/or aesthetics. Allowing the consumer to lift the product gives the consumer a better opportunity to assess the weight and feel of the product, as well as interact with the various features and other aspects of the product.

SUMMARY OF THE DISCLOSURE

In accordance with one aspect of the disclosure, a method of registering a security sensor device with a product device to be protected via the security sensor device. The method includes obtaining, by a networked computing device, sensor data identifying the security sensor device and including a sensor timestamp for an alteration in power delivery to the security sensor device, obtaining, by the networked computing device, product data identifying the product device and including a product timestamp for an alteration in power delivery to the product device, implementing, by the networked computing device, a comparison of the sensor timestamp and the product timestamp, and generating, by the networked computing device, registration data for the security sensor device and the product device based on the comparison, the registration data associating the security sensor device and the product device.

In accordance with another aspect of the disclosure, a method of registering a security sensor device with a product device to be protected via the security sensor device. The method includes obtaining, by a networked computing device, a sensor data package including sensor identification data, display location data, and sensor power event data, the display location data being indicative of a location of a product display in which the product device is displayed, the sensor power event data being indicative of an alteration in delivery of power to the security sensor device, obtaining, by the networked computing device, a product data package including product identification data and product power event data, the product power event data being indicative of an alteration in delivery of power to the product device, implementing, by the networked computing device, a comparison of respective timestamps of the sensor power event data and the product power event data, and if the respective timestamps match, generating, by the networked computing device, registration data for the security sensor device and the product device based on the sensor identification data and the product identification data, the registration data associating the security sensor device, the location of the product display, and the product device.

In accordance with another aspect of the disclosure, a networked computing device for registration of a security sensor device and a product device to be protected by the security sensor device. The networked computing device includes a processor, a memory in which correlation instructions and database management instructions are stored for execution by the processor, a storage device configured to store registration data associating the security sensor device and the product device, where the processor is configured via the execution of the correlation instructions to obtain, from the security sensor device via a first network communication, a sensor data identifying the security sensor device and includes a sensor timestamp for an alteration in power delivery to the security sensor device, obtain, from the product device via a second network communication, product data identifying the product device and including a product timestamp for an alteration in power delivery to the product device, implement a comparison of the sensor timestamp and the product timestamp, and generate the registration data for the security sensor device and the product device based on the comparison, and wherein the processor is configured via the execution of the database management instructions to store the registration data in the storage device.

In connection with any one of the aforementioned aspects, the methods and devices described herein may alternatively or additionally include any combination of one or more of the following aspects or features. The alteration in power delivery to the security sensor device includes a power connection or disconnection between the security sensor device and a display location via which power is delivered to the security sensor device. The sensor data includes display location data. The display location data is indicative of a location of a product display in which the product device is displayed. The registration data further associates the display location data with the security sensor device and the product device. The display location data identifies a cradle configured to receive the security sensor device. The display location identifies a plan-o-gram position of the location of the product display. The sensor data includes site location data indicative of a site in which the product display is located. The registration further associates the site location data with the security sensor device and the product device. The sensor data and the product data include sensor power event data and product power event data indicative of the alteration in power delivery to the security sensor device and the product device, respectively. The sensor power event data is indicative of whether the alteration in power delivery involves either a start or an end of power delivery to the security sensor device. The product power event data is indicative of whether the alteration in power delivery involves either a start or an end of power delivery to the product device. Implementing the comparison includes determining whether both the sensor power event data and the product power event data match regarding whether the alteration in power delivery involves either a start or an end of power delivery. Implementing the comparison includes determining whether the sensor timestamp and the product timestamp match. Generating the registration data includes associating the sensor data and the product data if the comparison reveals that the sensor timestamp and the product timestamp match. Obtaining the sensor data includes receiving a sensor data package including sensor identification data and sensor power event data. Obtaining the product data includes receiving a product data package including product identification data and product power event data. Obtaining the sensor data includes receiving a sensor data package from the security sensor device via an alarm control unit at a site in which the product device is located.

Obtaining the product data includes receiving a product data package from the product device via a service executing on the product device. Implementing the comparison includes determining whether both the sensor power event data and the product power event data match regarding whether the alteration in power delivery involves either a start or an end of power delivery. The registration data is generated if the sensor power event data and the product power event data match regarding whether the alteration in power delivery involves either a start or an end of power delivery. Generating the registration data includes sending the registration data to a network storage device for storage of the registration data in a registration database. The method further including storing, in the registration database, customer interaction data in association with the registration data, the customer interaction data involving a customer interaction with the product device. The processor is configured via the execution of the correlation instructions to generate the registration data such that the registration data associates the display location data with the security sensor device and the product device. The processor is configured via the execution of the correlation instructions to determine whether both the sensor power event data and the product power event data match regarding whether the alteration in power delivery involves either a start or an end of power delivery.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
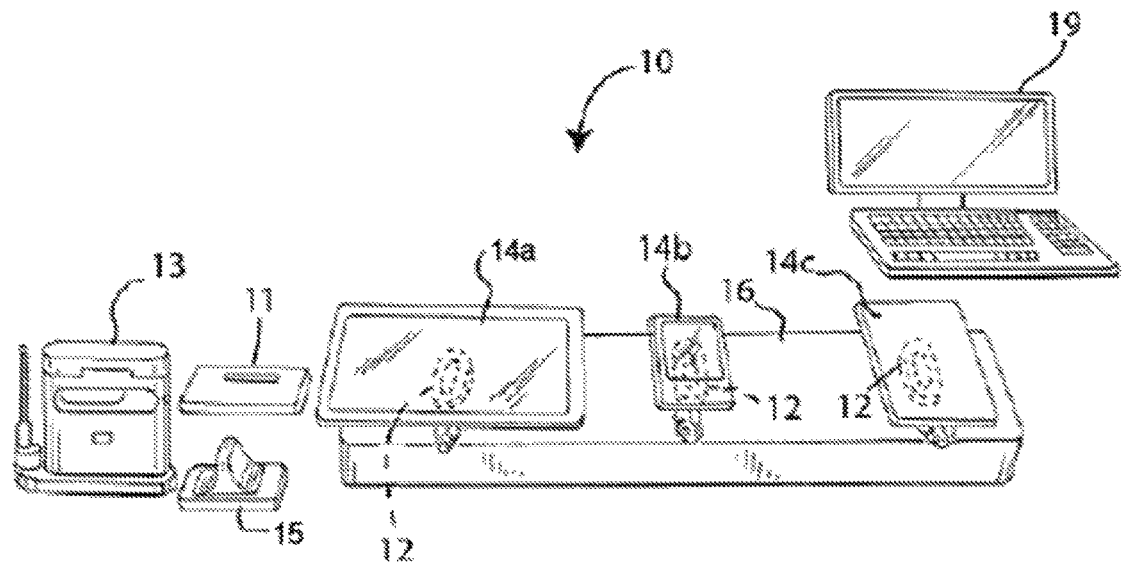
FIG. 1 is a perspective view of a system having a security sensor device to protect a product device in which registration of the security sensor device is implemented in accordance with one example.

The disclosed systems and methods are susceptible of embodiments in various forms. There are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF THE DISCLOSURE

Systems and methods for registering security sensor devices with product devices protected thereby are described. The systems and methods associate a respective one of the security sensor devices with a respective one of the product devices. Registration data indicative of the association, or registration, may then be stored for networked access and use. In some cases, the registration data is used to facilitate the collection and analysis of data regarding customer interaction with the respective product device, such as the number, frequency, duration, and other characteristics of product lifts. The registration data may be useful in a variety of other ways, including, for instance, the collection, tracking, monitoring, or other use of information regarding position, alarm, or other status of a product device.

The registration data provided by the disclosed systems and methods may support associations beyond pairing security sensor devices and product devices. A respective security sensor device and a respective product device may also be registered or associated with a product display location. The registration data may thus indicate a specific location within a retail environment at which the security sensor device and/or product device are disposed. For instance, the specific location within and/or of a particular display base or cradle may be identified. Such registration data is useful in helping to keep product devices in a specific, desired position on a product display apparatus. Such registration data may be useful in other ways, including, for instance, determining which respective physical locations correspond with higher or lower evaluation activity or other consumer interaction.

Various techniques for obtaining identification data underlying the registration data are described. In some cases, computer-readable markings, such as quick response (QR) codes, are scanned to obtain identification data for the security sensor device, the product device, and/or the product display location. Other types of markings or visual coding may be used, including, for instance, bar codes. Optical scanners or readers may be used to capture the identification data.

Other techniques for obtaining the identification data involve wireless communications. The wireless communications may be established by or with dedicated scanners or readers. Alternatively or additionally, the wireless communications do not involve separate scanners, but instead use a more direct communication link, such as a link between the respective security sensor device and the respective product device. The security sensor device and/or the product device may thus be configured to act as a scanner or reader in such cases. Still other techniques for obtaining the identification data may not involve wireless communications, including, for instance, techniques involving transmission of product location or other identification data via a tether, cable, or other connection between, e.g., a product display cradle or other base and a security sensor device.

The extent, frequency, and other circumstances under which the identification data is obtained may vary considerably. In some cases, the collection of the identification data may be initiated by a store employee operating a scanner. Other scanning may be scheduled or otherwise conducted automatically. Alternatively or additionally, the identification data is obtained upon the detection of an event, such as the attachment of a security sensor device and a product device.

The registration data may be transmitted for networked storage and access. In some cases, the networked storage includes or involves a database managed by a remote server. The remote server may be configured to implement data analytics on data indicative of customer interaction with the product device. For example, data including the quantity of times a certain product is evaluated, the frequency of evaluations, the respective times of day of each evaluation and/or the duration of each respective evaluation, and/or the respective physical position on the display that correspond to higher or lower evaluation activity, all may assist retailers and/or manufacturers in quantifying consumer interest in a certain product. The remote server may also be configured to facilitate user access to results of the data analytics, including, for instance, via mobile phone application or other user.

Although described in connection with tracking customer interaction, the disclosed systems and methods are not limited to usage scenarios involving data analytics on customer-product interaction. The registration data may be useful in connection with a wide variety of contexts and issues arising in product device display scenarios. For instance, the registration data may be useful in connection with retail setup compliance. Some retail stores set up and take down product displays daily. In such cases, the registration data may assist store employees in correctly positioning the products across all of the product displays. The registration data may also be useful in other compliance monitoring, including, for instance, stock-out compliance, in which the registration data is used to detect or identify out-of-stock products.

Figure 2:
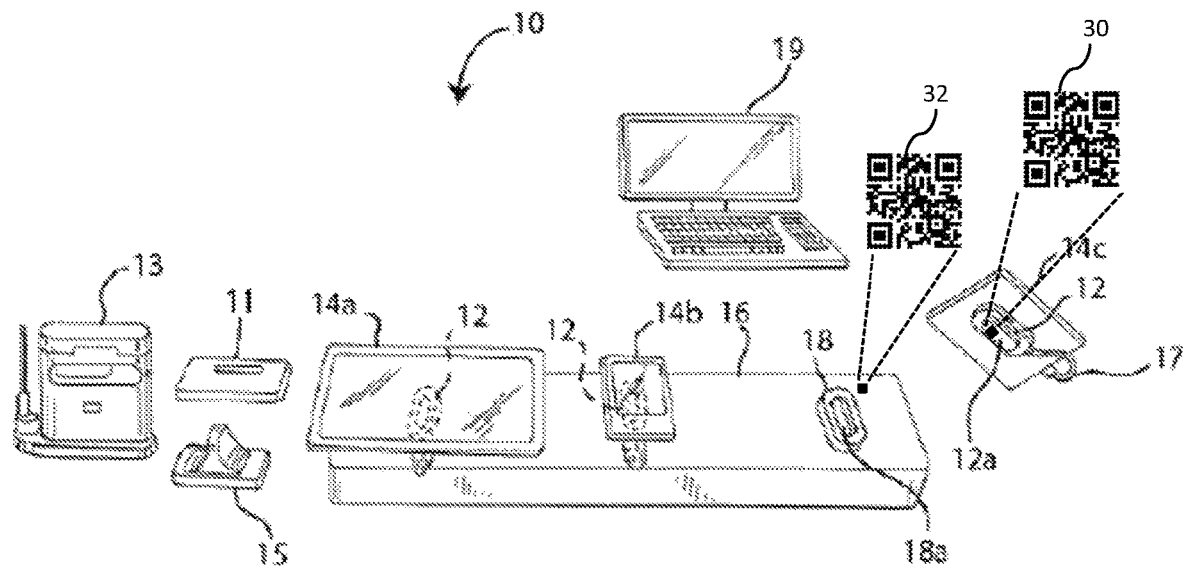
FIG. 2 is a perspective view of the system of FIG. 1 to depict a computer-readable marking of the security sensor device for registration of the security sensor device in accordance with one example.

FIGS. 1 and 2 illustrate a system 10 that provides security sensor and other registration data in accordance with one example. In this case, the system 10 has three example product devices 14A, 14B, 14C. In this case, all three product devices 14A-C are positioned and/or located on a display platform 16. The display platform 16 and the product devices 14A-140 may be located, for example, in a retail store, for consumer evaluation. Hereinafter, the product 14A, the product 14B and/or the product 14C may be collectively referred to as the product device 14. The product device 14 may be a portable electronic device, such as, for example, a cellular telephone, tablet computer, MP3 player, camera, GPS device and the like. However, the product 14 may be any device displayed and/or sold at, for example, a retail store. For example, the product 14 may be or include a non-electronic device.

The system 10 includes a number of security sensor devices 12 to provide security for the product devices 14A-C. Each security sensor device 12 may be affixed or otherwise coupled to a respective one of the products 14, for example, via an adhesive, and may dock to a respective cradle or base 18. The cradle 18 may be located on the display platform 16. The cradle 18 may have a recess 18A in which the security device 12 is received. For example, the security device 12 may have an extended portion 12A that docks within the recess 18A of the cradle 18. When the security device 12 is docked, the cradle 18 may provide power to and/or charge the security device 12 and/or the product 14. On the display platform 16, the product device 14 and/or the security device 12 may be presented in a docked position, i.e., the product 14 and/or the security device 12 may be docked to the cradle 18.

A consumer may lift the product device 14 and the security sensor device 12 from the cradle 18 and the platform 12, as shown in FIG. 2. In this case, the lift of the product device 14 results in a corresponding lift of the security sensor device 12. The consumer may then evaluate the product device 14 and, when finished, return the product device 14 to the cradle 18.

The configuration of the system 10 and the display platform 16 may differ from the example shown. For instance, in some cases, the system 10 includes one or more posts extending upward from the display platform 16. One of the cradles 18 may then be mounted or otherwise disposed at the end of the post. The posts allow the product devices to be further spaced from the display platform 16. In still other cases, the security sensor device 12 tethers the product 14 to the display 16. For example, a retractable cable (not shown) may extend from the security device 12 to the base 18. The cradle 18 and/or the retractable cable may provide power to the security sensor device 12 and/or to the product device 14. In some cases, the retractable cable may be disconnected from the security sensor device 12 via a key.

The system 10 includes a number of other components in communication with the security sensor device 12 to provide security for the product devices 14. In the example of FIG. 1, the system 10 includes an analytics, communications, or other data module 11, an alarm module 13, and an emitter 15. Other examples may have fewer or additional components on site with the product devices, as described below in connection with the example of FIG. 3. To maintain security when the security sensor device 12 is detached from the retractable cable and/or the base 18, the security sensor device 12 wirelessly communicates with the alarm module 13 and/or the emitter 15. Data communication among the various components within the system 10 may be implemented in accordance with a wireless standard networking protocol, e.g. IEEE 802.11. The data module 11, the alarm module 13 and/or the emitter 15 may be positioned near the display 16 of the product 14. As shown in FIG. 2, a computer 19, such as, for example, a laptop computer, may be positioned near the display 16, and may be connected to the data module 11, the alarm module 13 and/or the emitter 15.

Security for the product device 14 is provided in accordance with one example as follows. The alarm module 13 may be programmed to transmit a signal (e.g., a high frequency signal) to the emitter 15 to request the emitter 15 to transmit a signal (e.g., a low frequency signal) to the security sensor devices 12. If the security sensor device 12 is within range of the emitter 15, the security sensor device 12 may receive the low frequency signal 31 from the emitter 15 that may request the security sensor device 12 to transmit a signal to the alarm module 13. The security sensor device 12 may be programmed to then transmit a high frequency signal 32 to the alarm module 13 that indicates that the security device 12 is located within a range of the emitter 15. Alternatively, if the security sensor device 12 is located outside of the range of the emitter 15, the security sensor device 12 fails to receive the low frequency signal 31 from the emitter 15 and thus fails to transmit the high frequency signal 32 to the alarm module 13. The alarm module 13 may be programmed to produce an audio alarm and/or a visual alarm if the alarm module 13 fails to receive the high frequency signal 32 from the security sensor device 12. Additionally, the security sensor device 12 may be programmed to emit an audio alarm and/or a visual alarm if the security sensor device 12 fails to receive the low frequency signal 31 from the emitter 15. Further details regarding examples of the alarm module 13 and the emitter 15 are set forth in U.S. Patent Publication No. 2016/0307415 ("Apparatus, System and Method for Monitoring a Device within a Zone"), the entire disclosure of which is hereby incorporated by reference.

The manner in which the security sensor device 12 and other components of the system 10 provide security may vary from the above-described example. For example, the alarm module 13 may alternatively or additionally monitor a received signal strength indicator (RSSI) of a wireless signal transmitted from the security sensor device 12 to determine the proximity of the security sensor device 12 to the alarm module 13 and/or the emitter 14. Alternatively or additionally, the security device 12, the emitter 14, and/or the alarm module 13 may communicate via ultra-wideband signals. In these and other cases, the distance between the security sensor device 12, the emitter 14, and/or the alarm module 13 may be determined by monitoring a time of flight (TOF) of the various wireless signals between the various transceivers.

The data module 11 (and/or other components, as described below) may be programmed to monitor, collect, or otherwise communicate or process data within the system 10. In some cases, the data module 11 may include a transceiver to transmit and receive wireless signals to receive data regarding interactions with the product devices 14. The data module 11 may include a microprocessor or other processor programmed to monitor, log, or otherwise capture or process data communicated in the system 10. For example, the data module 11 may be programmed to capture data transmitted from the security sensor device 12, the alarm module 13 and/or the emitter 15. In some cases, the data module 11 may be connected to the alarm module 13. In other cases, some of the functionality of the data module 11 is provided remotely (e.g., by a remote server), as described below. In such and other cases, the data module 11 may include a router or other network gateway component(s).

The data module 11 (or processor thereof) may be programmed to manipulate the captured data and/or to determine statistical data. The statistical data may be indicative of various characteristics of the consumer interaction with the product devices of the product display. For example, the statistical data may be indicative of a quantity of lifts of the product device, a frequency of lifts of the product device and/or a duration of lifts of the product device. A clock of the data module 11 may identify the time of day of a lift, the time of day of a return and/or may time a lift duration. Further details regarding examples of the statistical data and analysis thereof are set forth in U.S. Patent Publication No. 2016/0308952 ("Apparatus, System and Method for Wirelessly Collecting Data Corresponding to a Security Device"), the entire disclosure of which is hereby incorporated by reference.

The security sensor device 12 (or processor thereof) may be programmed to detect or otherwise determine a position status, alarm status, and/or other status of the security sensor device 12. The security sensor device 12 (or processor thereof) may be further programmed to wirelessly transmit the status data to other component(s) of the system 10, e.g., using a high frequency signal. Examples of the status data include position status of the security device 12, alarm status of the security device 12, and/or other status data. In some cases, the security device 12 may be electrically connected to a port (not shown) of the product device 14 via, for example, a USB or other cable. Disconnection of the security sensor device 12 from the product device 14 and/or removal of the cable from the port of the security sensor device 12 may activate an alarm of the security sensor device 12. The alarm may be or include an audio alarm and/or a visual alarm. In the docked position, as shown in FIG. 1, the security sensor device 12 and/or the product device 14 may receive power via the cradle 18 and/or the retractable cable. The alarm of the security sensor device 12 may activate if a transceiver of the security device 12, for example, fails to receive a low frequency signal from the emitter 15.

The alarm module 13 may include a transceiver to transmit and/or receive wireless signals. A processor of the alarm module 13 may be programmed to detect signals (e.g., the above-described high frequency signal) and/or transmit, via the transceiver, other signals (e.g., the above-described high frequency signal). The processor may be programmed to activate an alarm during an alarm condition of the alarm module 13 and/or of the security sensor device 12. The alarm may be or include an audio alarm and/or a visual alarm.

The emitter 15 may include a transceiver to transmit and/or receive wireless signals. The emitter 15 may further include a processor (not shown) that may be programmed to receive and/or detect signals, such as the above-described high frequency signal from the alarm module. Further, the processor of the emitter 15 may be programmed to transmit, via the transceiver of the emitter 15, signals, such as the above-described low frequency signal.

In a retail store, for example, the data module 11 and/or the alarm module 13 (and/or a remote component of the system, such as a remote server described below in connection with FIG. 3) may be programmed to monitor status data transmitted in the system 10 and/or to determine statistical data corresponding to the product device 14. For example, the data module 11 may be programmed to log an evaluation of the product device 14. As shown in FIG. 1, the product 14 may be displayed in a static, e.g., docked, position on the display 16, such as on the cradle 18. As shown in FIG. 2, the processor of the security sensor device 12 may be programmed to detect a consumer lifting the product 14 from the display 16 and/or the cradle 18. Once the lift is detected, the security sensor device 12 may be programmed to transmit status data indicative of the lift. The manner in which the lift is detected may vary. For instance, in some cases, the security sensor device 12 includes an accelerometer configured to provide motion data used for lift detection.

A variety of statistical data may be captured, determined, logged, and/or otherwise acquired by the system 10. For instance, the timing, duration, type, and other characteristics of each product interaction may be logged. Still further data may be acquired, including, the quantity and frequency of interactions with respective product devices, types of product devices, product displays, display locations, and other categories or groups of product devices. Still other types of data may be acquired, including, for instance, data other than product lifts. For example, data indicative of, or otherwise related to, alarm conditions and/or usage (such as use of a key to disable or enable alarms), security sensor device health (e.g., battery information), alarm health (e.g., battery information), product status (e.g., charging or not charging, charge rate, etc.) may be acquired.

With reference to the example of FIG. 2, components of the system 10 include respective tags (e.g., identification tags) to facilitate the acquisition of the above-referenced data and other information regarding the product devices 14, the product displays, and other aspects of the system 10. In this example, the security sensor device 12 and the product display 16 include tags 30, 32, respectively. Additional, fewer, or alternative components may include tags in other cases. For instance, as described below, one or more of the product devices 14 may include respective tags. Each tag 30, 32 may be configured to uniquely identify a particular instance of the security sensor device 12, the product display 16, etc. Thus, each security sensor device 12 may have a unique tag for respective identification.

In some cases, each tag 30, 32 includes a label with a visual identification code or other computer-readable marking. In the example of FIG. 2, the visual identification code is a unique quick response (QR) code. The label of each tag 30, 32 may be affixed to the security sensor device 12. For example, the tag 30 for the security sensor device is a label affixed to an underside surface of the security sensor device 12.

As described below, the tags 30, 32 may be read or scanned to pair, correlate, or otherwise associate particular instances of the security sensor devices 12, product displays 16, and other components of the system 10 with one another. Such association of system components is generally referred to herein as registration. In one example, one of the security sensor devices 12 may be registered with a particular product device by scanning the tag 30. The product device 14 may be identified by various techniques, including, for instance, scanning a tag, as described below. The registration of two such items may be considered a pairing. In other examples, more than two items are registered with one another. For instance, one of the security devices 12 may be registered with a particular product device 14 and a particular location, e.g., display platform 16. The sensor-product and other associations may then be used to augment the data regarding the product interactions. For example, the interaction data for a particular security sensor device 12 may then be associated with a particular type of product device, product display, display location, etc. The registration data may be uploaded or otherwise provided to a database in which other data, e.g., interaction data, is stored. Various users may then access the database via, e.g., networked communications, to view, process, and otherwise use the data. Use scenarios are not limited to those involving the interaction data. For instance, the registration data may be useful in connection with facilitating the proper installation or setup of product displays in the retail environment.

Figure 3:
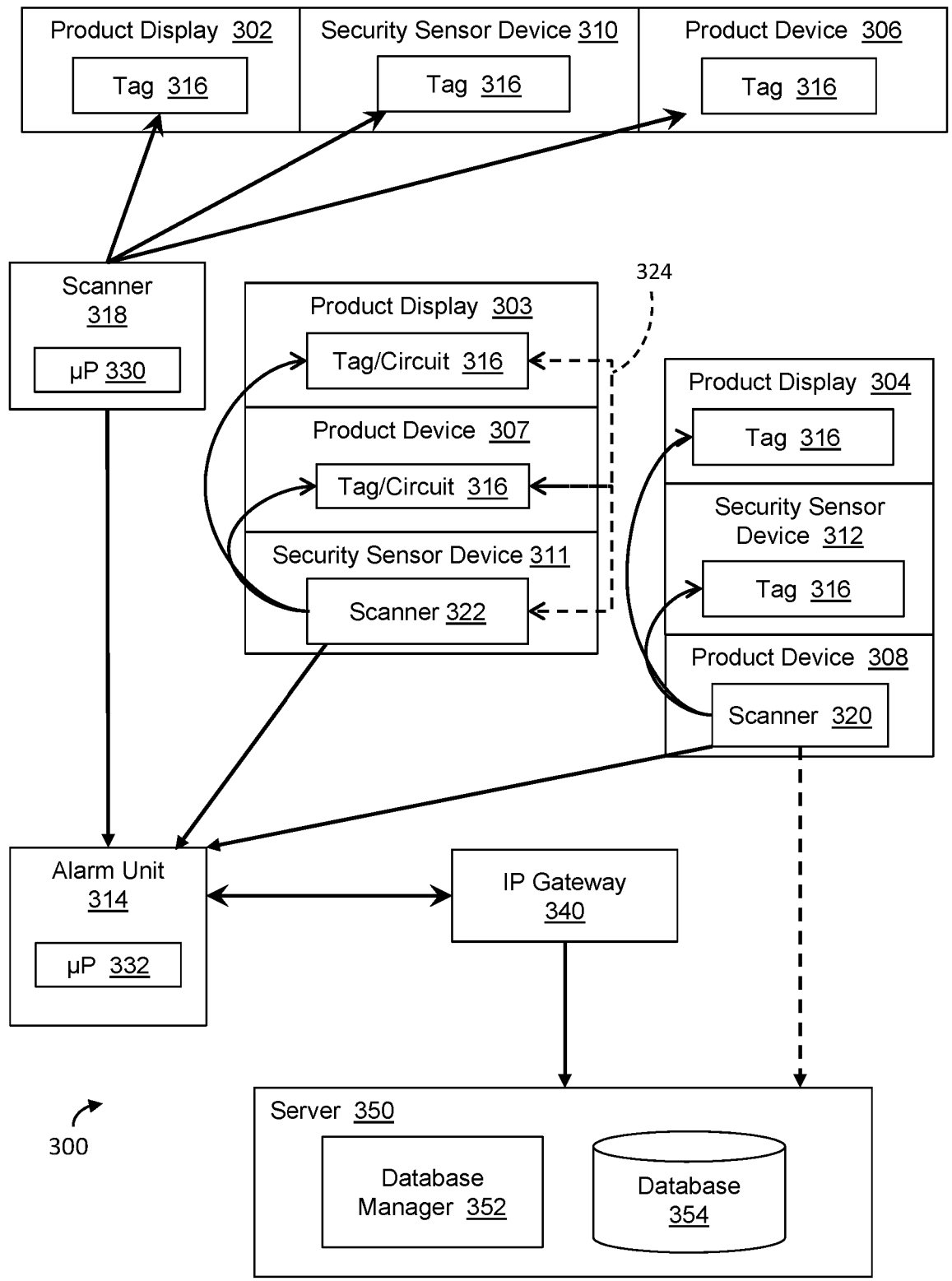
FIG. 3 is a block diagram of a system for registration of security sensor devices, product devices, and product display locations in accordance with one example.

FIG. 3 depicts a system 300 for product display registration in accordance with one example. In this case, the system 300 includes three instances of product display apparatus 302-304. Each product display apparatus 302-304 is configured to support one or more product devices 306-308 on display. Only a single product device is shown with each product display apparatus for ease in illustration. In some cases, each product display apparatus 302-304 includes a display platform, such as the display platform 16 of FIGS. 1 and 2. The product display apparatus 302-304 may alternatively or additionally include other structures. For example, the product display apparatus 302-304 may include a post or other extension on which a product device is mounted or otherwise disposed. The configuration of the product display apparatus 302-304 and the arrangement of the product devices 306-308 may vary considerably. The manner in which the product display apparatus 302-304 supports the product devices on display may thus vary.

Each product device 306-308 is protected by a respective security sensor device 310-312. In some cases, each security sensor device 310-312 is configured for wireless communications with an alarm unit 314 or other control unit of the system 300. The wireless communications may be implemented as described above. Each security sensor device 310-312 may be otherwise configured as described above in connection with the examples of FIGS. 1 and 2. The configuration of the security sensor devices 310-312 may vary. For instance, one or more of the security sensor devices 310-312 may include functionality other than security sensing, as described below.

Components of the system 300 include a marking or other tag 316 to identify the components for registration. Each tag 316 may be computer-readable or otherwise capable of being processed to obtain identification data for the component of the system 300. In some cases, the tag 316 is or includes a computer-readable marking, such as a QR code as described above in connection with FIG. 2. A variety of other visual identifiers may be used, including, for instance, bar codes. The computer-readable marking may or may not involve affixing a label to the system component. For example, the marking may be displaying on a screen of the system component (e.g., product device) or provided in some other way, such as via a catalog. For example, the product device 306 may be configured to generate an image of the tag 316 on a user interface of the product device 306. In other cases, the tag 316 is or includes a circuit configured for wireless communication of the identification data, such as an RFID tag. The circuit may be passive or active.

In still other cases, the tag 316 may be audible, as in a beep or other sound generated by the component of the system 300. For instance, the security sensor device 310-312 is configured to emit sound indicative of the sensor identification data. The emitted sound may then be captured via, e.g., a microphone or other audio scanning. To this end, the security sensor devices may be configured for bi-directional audio communications, e.g., for providing and/or obtaining identification data. The nature and other characteristics of the tags 316 may thus vary.

The nature of the identification data provided by the tags 316 varies based on the item being identified. The identification data for the product devices 306-308 is referred to herein as product identification data, and may be indicative of the product device. For instance, the product identification data may be indicative of a particular type (e.g., manufacturer, model, model name, etc.) of product device and/or a particular instance of the product device (e.g., a serial number, International Mobile Equipment Identity (IMEI) number, or other identity number). The identification data for the security sensor devices 310-312 is referred to herein as sensor identification data, and may be indicative of one of the security sensor devices (e.g., a particular instance of the security sensor devices). The identification data for the product display apparatus 302-304 may be or include display location data indicative of a location of the product display apparatus. For instance, the display location data may be indicative of a platform, table, cradle, base, cord winder, area, or other portion of the display apparatus or retail environment in which the product display apparatus is located. Thus, in some cases, the display location data may be indicative of objects that are capable of being moved about the retail environment. Alternatively or additionally, the display location data is indicative of a physical, fixed location in the retail environment, such as a fixture of the retail environment and/or display apparatus.

The system 300 presents multiple techniques for acquiring or otherwise obtaining the identification data from the tags 316. One technique uses a scanner 318 of the system 300 to acquire the identification data. In this technique, the scanner 318 is an independent device (e.g., independent of the other components of the system 300) that, in some cases, is dedicated to acquiring the identification data. In the example of FIG. 3, the scanner 318 is configured to read or otherwise obtain the identification data from the product display 302, the security sensor device 310, and the product device 306 by scanning or reading the tags 316 thereof. In cases in which the tags 316 are markings, the scanner 318 may thus be or include a camera or other image acquisition device to obtain an image of the tags 316. The scanner 318 may then process the captured images to determine or otherwise obtain the identification data from the tags 316. For instance, the scanner 318 may be configured to read the tag 316 of the security sensor device 310 to capture or obtain the sensor identification data for that particular item. Similarly, the scanner 318 may be configured to read the tag 316 of the product device 306 to capture or obtain the product identification data for that particular item. Lastly, the scanner 318 may be configured to read the tag 316 of the product display apparatus 302 to capture or obtain the display location data for that particular display location.

Some techniques for obtaining the identification data from the tags 316 utilize one of the other components of the system 300 to acquire the identification data. In such cases, the component providing the scanning function may itself be one of the devices or items being registered. The scanner may be a built-in component of the device. The scanner 318 is thus integrated with the system 300, rather than an independent or standalone component thereof. In the example of FIG. 3, one of the product devices 308 includes a scanner 320 or reader configured to acquire the identification data. In one example, the product device 308 is a phone or other handheld device with a camera. To acquire the identification data, the camera captures images of the tags 316 of the product display apparatus 304 and the security sensor device 312 as shown schematically in FIG. 3. In some cases, the product device 308 may be configured to operate in a manner similar to the standalone scanner 318.

In yet another technique, one of the security sensor devices 311 includes a scanner 322 or reader. The example of FIG. 3 depicts two different data acquisition techniques. In one case, the scanner 322 obtains image data via a camera or other image acquisition device. Alternatively or additionally, the scanner 322 is configured to establish wireless communications 324 with the tags 316 to obtain the identification data. The wireless communications may be RFID communications, near field communications (NFC), and/or other radio frequency communications. As described above in connection with FIGS. 1 and 2, the security sensor device 311 may be further configured to collect interaction data for the product device 307. The interaction data is indicative of consumer interaction with the product device 307.

In cases having integrated scanning, the identification data for the device having the scanner may be obtained without scanning or reading a tag. For example, the device having the integrated scanner may obtain its own identification data by accessing a memory of the device. Obtaining the identification data may thus, in some cases, include a data lookup, memory access, or other data acquisition procedure. Memory access or other procedures may be useful, for example, in obtaining the IMEI or serial number of a product device. Alternative or additional techniques for obtaining identification data without scanning include using a wired connection between the source and destination of the identification data. For example, if a security sensor device is gathering or otherwise obtaining identification data, the display location data may be provided to the security sensor device via a cable or other wired connection between the product display apparatus and the security sensor device. Alternatively or additionally, the identification data may be communicated or provided or obtained through a power connection, e.g., using power line communications. To that end, the system 300 may include a power hub that modulates, encodes, and/or otherwise transmits messages via the power line connected to, for instance, each cradle, base, or other display apparatus.

In many cases, not all of the techniques are utilized in a particular implementation of the system 300. For instance, the independent scanner-based technique may not be utilized in examples in which all of the product devices on display in a particular retail environment are capable of acquiring identification data. Multiple techniques are nonetheless shown together in the example of FIG. 3 for ease in illustration. Additional, fewer, or alternative techniques may thus be provided. For instance, one alternative technique involves using one of the product devices 308 to acquire identification data for itself as well as other product devices 306, 307. The product device 308 may thus act as a scanner for the other product devices 306, 307.

The identification data may be obtained in still other ways. Techniques other than those shown in FIG. 3 may be used to obtain the identification data. For instance, in some cases, the product device 308 may be configured for NFC, RFID, and/or other wireless communications to obtain the identification data. Other types of electronic tags may be used. Other techniques may include or involve user entry of data into a user interface of one of the components of the system 300, such as one of the security sensor devices and/or one of the product devices. The user interface may be or include a web page, a spreadsheet, document, or other dialog for data entry.

The system 300 generates registration data based on the identification data. For example, the registration data to associate or register one of the security sensor devices and one of the product devices is based on the respective sensor identification data and the respective product identification data. The registration data thereby associates the respective security sensor device and the product device with one another. In the example of FIG. 3, the registration data for the product display apparatus 302, the security sensor device 310, and the product device 306 is based on the identification data obtained via the scanner 318.

The system 300 includes one or more processors 330, 332 configured to generate registration data based on the identification data. In the example of FIG. 3, one of the processors 330 is a microprocessor of the scanner 318. The other processor 332 is a microprocessor of the alarm unit 314. Other types of processors may be used. For instance, the processor may be or include a microcontroller or other controller. Additional, fewer, or alternative processors may be provided. For example, one of the product devices, such as the product device 308 with the scanner 320, may also include a processor configured to generate the registration data.

The manner in which the registration data is generated from the identification data may vary. In some cases, the registration data may include the identification data. For example, the registration data may be or include a concatenation or other combination of the identification data for the associated security sensor device, product device, and/or product display apparatus. Alternatively, the registration data may include a subset of the identification data. For example, generating the registration data may involve removing one or more portions of the identification data not necessary for identifying the items. The registration data may be generated by translating the identification data into a different format. For example, a QR code or other identification data may be applied to a lookup table, key, or other function to generate a portion of the registration data. The registration data may be derived from the identification data in still other ways. For example, the registration data may be generated by a hash or other function that takes the identification data as input parameters.

The system 300 includes a gateway 340 to support network communications. The network communications send the registration data to a network storage device. The communications may be between components of the system 300 and/or with elements outside of the system 300. In the example of FIG. 3, the gateway 340 supports communications between the alarm unit 314 and a server computer 350. The server computer 350 may be or include a remote computer, e.g., remote from the retail environment in which the product devices 306-308 are on display. The communications with the server computer 350 may thus include or involve an internet connection. The communications may accordingly use internet protocol (IP), in which case the gateway 340 is configured as an IP gateway. The server computer 350 may or may not be a component of the system 300. Other protocols or types of communications may be used.

The gateway 340 may be or include a modem, router, and/or other communication devices. Alternatively, the gateway 340 includes a server computer or other computer. The configuration and other characteristics of the gateway 340 may vary. For example, in some cases, the gateway 340 includes a set of connected devices, such as a modem, router, and server computer.

The system 300 may use additional or alternative network communications. For example, the product device 308 may send identification data and/or registration data to the server computer 350 directly (e.g., without the alarm unit 314 as an intermediary). As shown in FIG. 3, a communication link may be established between the scanner 320 of the product device 308 and the server computer 350. Thus, in some cases, the product device 308 includes a network communication device for sending the registration data to a network storage device, such as the server computer 350. In still other cases, the network communication device is provided by another component of the system 300, such as one of the security sensor devices 311.

Storage on the server computer 350 or other network storage device makes the registration data accessible for various uses. For example, registration data and the associated interaction data may be aggregated, compared, or otherwise processed for multiple retail sites. The server computer 350 may include a database manager 352 configured to receive and respond to database queries and implement other processing operations on a database 354 in which the registration and other data is stored. The registration data may be used for additional or alternative purposes. For example, the registration data may be accessed in connection with disabling or locking an instance of a product device that enters an alarm status while on display. In such cases, the IMEI and/or serial number may be used to disable or lock the product device. To that end, the server computer 350 may generate and send a message to the product device (and/or another server associated with the product device).

The registration data sent to the server computer 350 may be further processed by the server computer 350. For example, the registration data may be reformatted or otherwise transformed before storage in the database 354. Thus, the registration data stored in, and accessible from, the server computer 350 may differ from the registration data sent via the IP gateway 340 or other network communication device.

Figure 4:
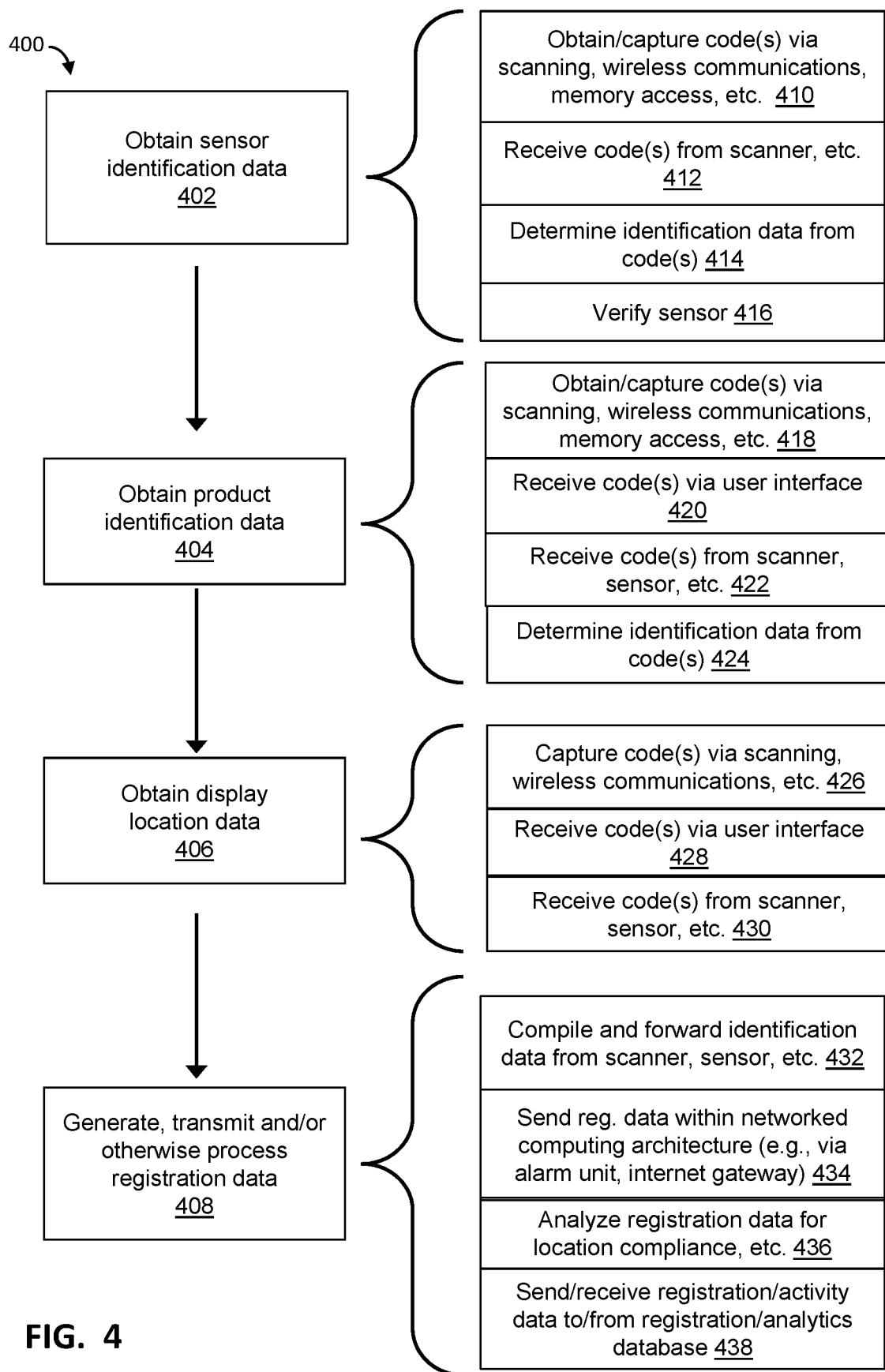
FIG. 4 is a flow diagram of a method of registration of security sensor devices, product devices, and product display locations in accordance with one example.

FIG. 4 is a flow diagram of a method 400 of registering a security sensor device with a product device to be protected via the security sensor device. The method 400 may be implemented by one of the processors 330, 332 described above in connection with the system 300 of FIG. 3, or another processor, such as a processor of the security sensor device 311 (FIG. 3) or the product device 308 (FIG. 3). Alternatively, the method 400 is implemented by more than one of the above-described processors. For example, some of the acts of the method 400 may be implemented by the processor 330 (FIG. 3) and/or other processor of a device that scans or otherwise obtains identification data, while one or more other acts are implemented by the processor 332 (FIG. 3). In still other cases, one or more acts of the method 400 are implemented by a processor other than those shown or described in connection with the examples of FIG. 3.

The method 400 includes an act 402 in which sensor identification data is obtained for the security sensor device. The sensor identification data is indicative of the security sensor device. For example, the sensor identification may be indicative of an instance of the security sensor device. Each instance may be uniquely identified by a serial number or other distinct unit number or other code. The nature of the sensor identification data may thus vary.

The security sensor device may be one of the security sensor devices described hereinabove. The sensor identification data may be received from different sources, captured via various types of readers or other scanners, derived from raw data acquired by the various types of scanners, or otherwise captured, acquired, or determined. In some cases, the security sensor device obtains the sensor identification data from itself. The manner in which the sensor identification is obtained in the act 402 may thus vary. Further details are provided below in connection with a number of examples.

Product identification data is obtained in an act 404 for the product device protected by the security sensor device for which sensor identification data is obtained. The product device and the security sensor device may thus be associated or registered with one another. The product identification data may be indicative of the product device in one or more ways. For instance, the product identification data may be indicative of a product name and/or product model. Alternatively or additionally, the product identification data may be indicative of a serial number, IMEI number, and/or other data indicative of a particular instance of the product device. The nature of the product identification data may thus vary. The product device may be any one of the product devices described in connection with the examples of FIGS. 1-3.

The manner in which the product identification data is obtained in the act 404 may vary. The product identification data may be received from different sources, captured via various types of readers or other scanners, derived from raw data acquired by the various types of scanners, or otherwise captured, acquired, or determined. In some cases, the product device obtains the product identification data from itself. Further details are provided below in connection with a number of examples.

The method 400 includes an act 406 in which registration data is generated for the security sensor device and the product device. The registration data is generated based on the sensor identification data and the product identification data. The registration data associates the security sensor device and the product device with one another. The registration data may be generated by one of the above-described processors or a different processor. The generation of the registration data may occur in connection with the transmission of the registration data to, for instance, a remote storage device. The timing of the generation may nonetheless vary.

For instance, the registration data may be generated after data transmission of the identification data (and/or raw or other data underlying the identification data). The nature of the registration data may also vary, as described herein.

The act 406 may include other processing of the registration data. For example, in some cases, the registration data is processed with other data, such as activity data indicative of activity involving the product device and/or the security sensor device. For instance, the activity data may be indicative of consumer interaction with the product device and/or indicative of alarm or other status data provided by the security sensor device.

FIG. 3 depicts a number of options and examples of the acts 402, 404, 406, and 408. Each act is addressed separately below.

The sensor identification data may be obtained in the act 402 in a variety of different ways. In some cases, one or more codes, such as QR or other labels or other visual markings, for the sensor identification data are captured or otherwise obtained in an act 410. The code(s) may be raw data from which the sensor identification data is derived, and/or constitute the sensor identification data itself. The code(s) may be captured or acquired via scanning (e.g., optical, RFID, or other scanning) the security sensor device, and/or wireless communications (e.g., NFC communications) with the security sensor device. Various types of scanners may be used, as described above. Obtaining the sensor identification data may thus include establishing a wireless communication link with the security sensor device, such as a link between a scanner and the security sensor device. In some cases, the product device is configured to implement, or otherwise includes, the scanner. The wireless communication link may involve both the security sensor device and the product device in these and other cases.

Alternatively or additionally, the code(s) are obtained via memory access. For instance, the code(s) may be accessed in the memory of the security sensor device. The memory access may be useful in cases in which the security sensor device is configured to provide, or otherwise include, a scanner, e.g., for obtaining other types of identification data. In cases in which a separate, independent, or other scanner is used, code(s) underlying or otherwise for the sensor identification data may be received from the scanner in an act 412. In these and other cases, obtaining the sensor identification data may include deriving or otherwise determining in an act 414 the sensor identification data from the code(s).

The act 402 may also include verifying a security sensor device in an act 416. Verification may be useful in one or more ways. For example, the security sensor device may be verified as an eligible device. Security sensor devices deemed eligible for registration with the product device may correspond with those deemed well-suited for protecting the product device. The manner in which the security sensor device is verified may vary. For instance, the verification process may include checking the code(s) or sensor identification data against a database of security sensor devices. In other examples, the scanner may be capable of implementing the verification.

Obtaining the product identification data in the act 404 may include capturing or otherwise obtaining one or more codes via scanning, wireless communications, memory access, or other acquisition techniques in an act 418. The scanning and wireless communications techniques may be similar to those described above. Various types of scanners may be used, including built-in or integrated scanners, as well as separate or independent scanners. A memory access may be used to obtain the code(s) for the product identification data when the product device is configured to provide, or otherwise include, a scanner.

Alternatively or additionally, the code(s) for the product identification data may be received in an act 420 via a user interface of the product device. For example, a scanner may provide a user interface, such as a drop-down menu, that allows a user to select the model, name, and/or other characteristic or identifier of the product device from a list. In some cases, the scanner is provided by the product device. Obtaining the product identification data may thus include receiving a user selection of the model (or other product characteristic) via the user interface.

The act 404 may include receiving the code(s) for the product identification data from a scanner in an act 422. In some cases, the security sensor device includes the scanner. A variety of scanners may be used.

The code(s) may or may not constitute the product identification data. In some cases, the product identification data is derived or otherwise determined from the code(s) in an act 424. For example, a QR or other computer-readable code is translated into the product identification data by the scanner and/or other system component in communication therewith.

In the example of FIG. 4, the registration data further associates the security sensor device and the product device with display location data. The display location data may be indicative of a location of a product display, such as the location of a display platform or cradle or other area in which the product device is displayed. The display location data may be obtained in the act 406 in ways similar to those described above in connection with the sensor identification data and the product identification data. For instance, as shown in the examples of FIG. 4, the act 406 may include capturing one or more codes via scanning or wireless communications in an act 426. The code(s) may alternatively be received in an act 428 via a user interface (e.g., via user selection from a drop-down or other list). Obtaining the display location data may also or alternatively include receiving in an act 430 the code(s) from a scanner or other system component, such as the security sensor device.

The processing of the registration data in the act 408 may include compiling the identification data in an act 432. The identification data had been obtained from a scanner, sensor, and/or other device, as described above. The compiled identification data may then be forwarded or otherwise transmitted. In some cases, the registration data is sent in an act 434 to a network storage device for storage of the registration data in a registration database. The act 434 may include sending the registration data within a networked computing architecture, such as via an alarm unit and an IP gateway as described above. Alternatively or additionally, the registration data may be sent from a scanner, such as a product device including the scanner.

The processing of the registration data may include various types of data analysis. In the example of FIG. 4, the registration data is analyzed for location or other compliance in an act 436. The proper placement of the product devices may thus be confirmed. Other types of compliance checks may be implemented. For instance, the registration data may be analyzed to confirm that product devices are not out-of-stock or close thereto.

The processing of the registration data may also include sending, receiving, and/or storing other types of data in conjunction with the registration data in an act 438. For example, activity data may be received from the security sensor device. The activity data may be indicative of activity detected by the security sensor device. In some cases, the activity data is indicative of consumer interaction with the product device. Other types of activities involving the product device may also be tracked via the activity data, including, for instance, alarm and other status data. The act 438 may then include storing the activity data in a database in which the registration data is stored to associate the activity data with the product device.

The order of the acts of the method 400 may differ from the example shown in FIG. 4. For instance, the product identification data may be obtained before or concurrently with the sensor identification data.

The method 400 may be implemented automatically and/or initiated by a user. For example, the method 400 may be implemented periodically or automatically upon the occurrence a trigger event. Alternatively or additionally, the implementation may be scheduled to coincide with various activities in the retail environment, such as display setup, display location compliance checks, or stock evaluations.

The method 400 may include additional, fewer, or alternative acts. For instance, the method 400 may include an act in which the identification data for a product device or other system component is changed. In one example, a product device updates its own identification information to a new name and/or number upon scanning or other reading. For instance, a temporary name is assigned whenever the product device is placed upon an NFC tag or reader, and/or a product display cradle or base. The name may then be changed back, e.g., to a default name, upon removal from that location.

Described above are systems and methods for the pairing, association, or other registration of product devices (or merchandise) and security sensor devices protecting the merchandise. The registration may further include associating a particular product display apparatus or location with a respective product device. The pairing or other registration may be facilitated through scanning or otherwise obtaining identification information, such as optically, by radio frequency, or by audio frequency, manually or automatically. In some cases, a separate mobile scanner may be used. In other cases, a scanner built-in to the security sensor device itself and/or the product device itself is used. For example, the product device or other scanner may be configured to scan QR code or other labels fixed to the security sensor device and/or the product display apparatus, e.g., the display platform or base. QR or other codes may also be captured by scanning the code(s) displayed on a device screen or printed as part of a product catalog. In other cases, NFC, RFID, or other wireless communications are used to obtain the identification information. In still other cases, audio tones may be used to provide the identification information. The scanner or other system component may then forward registration data indicative of the sensor identification data, the product display location, and the product model information to a networked storage device.

Described below are systems and methods for automatically implementing such registration, e.g., registering security sensor devices with product devices protected thereby. The systems and methods automatically pair or associate a respective one of the security sensor devices with a respective one of the product devices. The registration may also associate the security sensor device and the product device with a display location, e.g., a display or plan-o-gram location and/or a site location. Registration data indicative of the association or registration may then be stored for networked access and use, as discussed above. Such automatic pairing or registration avoids errors that may arise from reliance on manual processes, such as QR code scanning. Automatic registration also avoids inaccuracies arising from store personnel manually entering incorrect information or neglecting to implement the registration. The disclosed systems and methods may also be capable of un-registering security sensor devices and product devices.

The automatic registration is based on timestamps (or timestamp data). The timestamps is indicative of the timing of events involving the product device (or merchandise) and the security sensor device protecting the merchandise. The events are or involve an alteration in power delivery to the merchandise and the security sensor device.

The timestamps (or timestamp data) are compared to one another. If two timestamps match, then the corresponding security sensor device and product device are automatically linked or paired with one another. Registration data based on the comparison is accordingly generated. The registration data may be or include data similar to the registration data described above, including, for instance, a unique sensor identifier for the security sensor device, and brand name, model number, unique serial number, IMEI, and other product specific information. A networked computing device, such as a server device, may obtain the timestamps, implement the comparison, and generate the registration data.

The automatic registration may also support the automatic collection of position data. The position data may be or include display location data and/or site location data. For instance, the position data may be indicative of a retail site and/or a plan-o-gram position within a retail site, as described above. For instance, a unique identifier of a display cradle may be automatically registered with the security sensor device and the product device. The position data may be obtained in various ways, e.g., in conjunction with data for the security sensor device or independently thereof. For instance, the display location data or other position data may be provided by the security sensor device, e.g., as part of a sensor identification data package. Alternatively or additionally, the display location data or other position data may be obtained via a separate data package. One or more of the data packages may be sent via an IP gateway by which timestamp data for the security sensor device is sent to the networked computing device.

Figure 5:
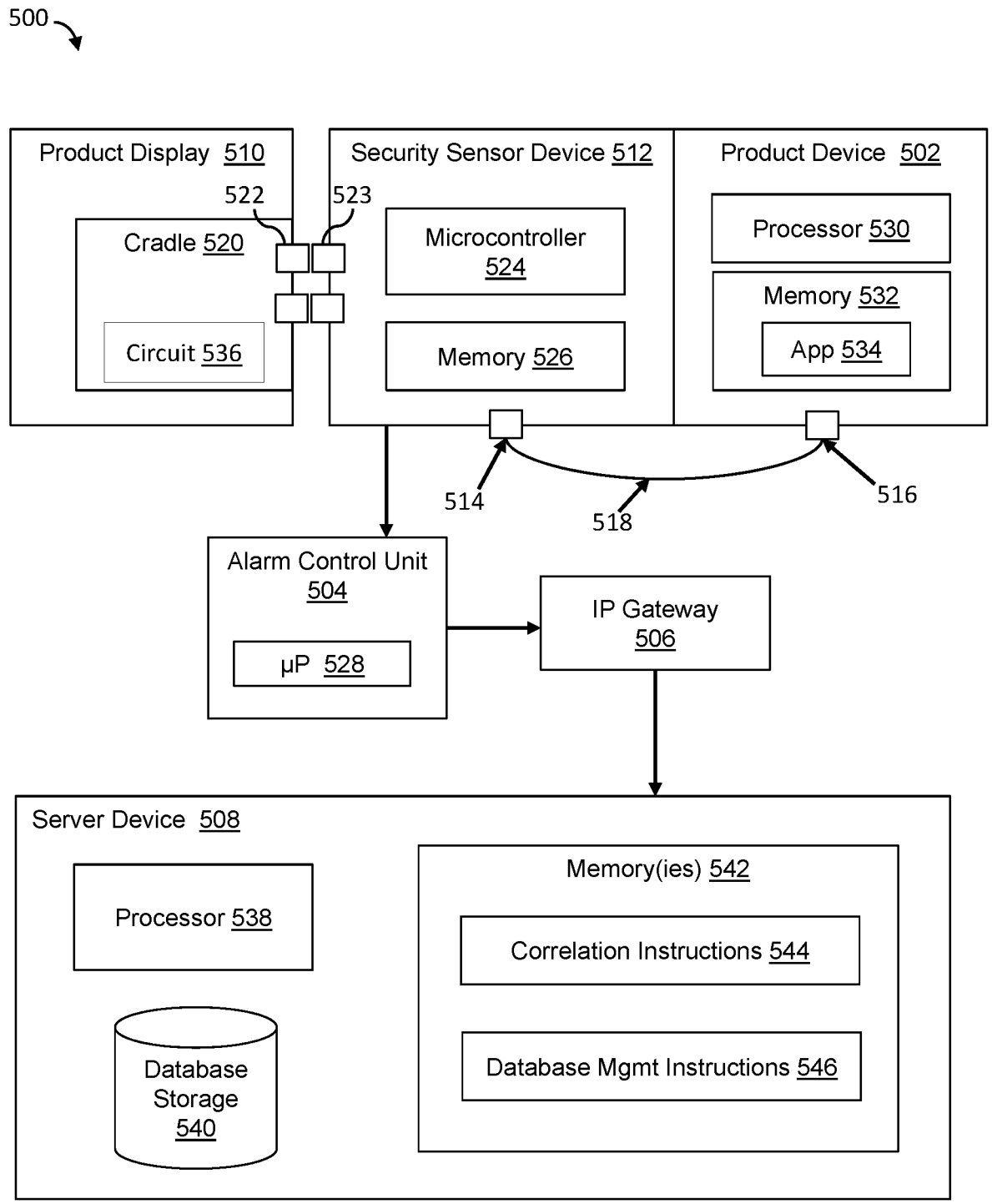
FIG. 5 is a block diagram of a system for timestamp-based, automatic registration of security sensor devices, product devices, and product display locations in accordance with one example.

FIG. 5 depicts a system 500 for product display registration using timestamps in accordance with one example. The system 500 is used in conjunction with the display of a product device 502. The product device 502 may be merchandise on display in, e.g., a retail environment, as described above. In some cases, some of the elements or components of the system 500 are disposed on-site (e.g., at the retail site), while other elements or components of the system 500 are disposed remotely (e.g., the location of a server computer or other networked computing device).

The product device 502 and other aspects of the display may be similar to that described above in connection with the examples of FIGS. 1-3. For instance, the product device 502 may be an electronic device, such as a phone, tablet, or other portable computing device. The product device 502 may be configured for wireless and/or other network communications. The communications may be configured in accordance with internet protocol (IP). Other communication protocols or types of communications may be used. For instance, communications in accordance with one of the IEEE 802.11 standards may be used. Alternatively or additionally, the network communications to/from the product device 502 are or include wired communications.

The system 500 includes an alarm control unit 504 to support or otherwise provide security-related services for the product device 502. The alarm control unit 504 may be configured similarly to the examples described above. For instance, the alarm control unit 504 may receive status updates and other data from the security sensor device(s) 512 to determine whether to generate an alarm. The communications with the alarm control unit 504 may be wireless communications. For example, the alarm control unit 504 may communicate with other system components via one of the IEEE 802.11 standards. The protocol and other characteristics of the communications may vary. For instance, wired communications may be used.

The system 500 includes a gateway 506 to support network communications. The gateway 506 may be configured similarly to the examples described above. For instance, the communications may use internet protocol (IP), in which case the gateway 506 is configured as an IP gateway. Other protocols or types of communications may be used, as described above. The gateway 506 may be or include a modem, router, and/or another communication device. Alternatively, the gateway 506 includes a server computer or other computer. The configuration and other characteristics of the gateway 506 may vary. For example, in some cases, the gateway 506 includes a set of connected devices, such as a modem, router, and server computer.

The gateway 506 establishes or otherwise supports communications between components of the system 500 at the product display site and one or more remote sites. In the example of FIG. 5, the gateway supports communications with a server computer 508 of the system 500. The server computer 508 may thus be located remotely from the product device 502 and the alarm control unit 504. The server computer 508 is directed to supporting the product display registration, as described below. In some cases, the server computer 508 provides registration-related services for multiple alarm control units and product display sites. The server computer 508 may be or include one or more networked computing devices, the configuration of which may vary.

The system 500 includes a server device 508, e.g., server computer device, to implement one or more aspects of the registration. The server device 508 may correspond with, or be configured similarly to, the server or other networked devices described above, such as the server 350 of FIG. 3. The server device 508 may receive data regarding the registration via the gateway 506 or through other communications (e.g., network communications). In the example shown, the server device 508 receives data from the alarm control unit 504 through the gateway 506. The server device 508 may receive other data, such as data from the product device 502, via an IP or other communication link. The communication link(s) allow the server device 508 to be or include a remote computer, e.g., remote from the retail environment in which the product device 502 is on display. The manner in which the server device 508 communicates with the other components of the system 500 may thus vary. For instance, a variety of other protocols or types of communications may be used.

The product device 502 is presented via a product display (or product display apparatus) 510 of the system 500. The product display apparatus 510 may be configured as described above in connection with the examples of FIGS. 1 and 2. For instance, the product display apparatus 510 may correspond with, or include, the display platform 16 of FIGS. 1 and 2. The product display apparatus 510 may alternatively or additionally include one or more other structures, as described herein.

The system 500 includes a security sensor device 512 to protect the product device 502 as described above. The security sensor device 512 may be configured similarly to the examples described above. For instance, the security sensor device 512 may be or include a unit physically attached, or otherwise secured, to the product device 502, as described above. In the example shown, the security sensor device 512 is configured for wireless communications with the alarm unit 504 to support the generation of alarms or alerts, as described above.

In the example of FIG. 5, the security sensor device 512 is also connected to the product device 502 via a port 514 of the security sensor device 512. In some cases, the port 514 may be directed to providing power and/or data to the product device 502 via, e.g., a port 518 of the product device 502. In the example shown, the system 500 includes a cable 518 for a wired connection between the ports 514, 516. The port 514 may be or include a socket or other terminal. Other types of interfaces may be used.

The security sensor device 512 may receive power via the product display apparatus 510. In the example of FIG. 5, the product display apparatus 510 includes a cradle 520. The cradle 520 is configured to support the product device 502 and the security sensor device 512. As described above, the security sensor device 512 may engage the cradle 520 to position the product device 502 on the product display apparatus 510. In the example shown, the cradle 520 includes power pins 522 positioned and otherwise configured to engage or contact power pins 523 of the security sensor device 512. Placement of the security sensor device 512 on the cradle 520 aligns the power pins 522, 523 as shown. In some cases, the alignment of the power pins 522, 523 establishes contacts for current flow to the security sensor device 512.

The manner in which power is delivered to the security sensor device 512 and the product device 502 may differ from the example shown. For instance, the product display apparatus 510 and the security sensor device 512 may not have power pins. Power may instead be provided wirelessly, e.g., via an inductive connection between the product display apparatus 510 and the security sensor device 512. A wireless (e.g., inductive) connection may also be established between the security sensor device 512 and the product device 502. Power may alternatively or additionally be delivered capacitively.

Events in the delivery of power to the security sensor device 512 and the product device 502 are used to support the registration. Power events involve an alteration in the delivery of power. Power events may involve a power connection (i.e., power being supplied) or a power disconnection (i.e., power not being supplied). The timing of each power event is identified, e.g., via a timestamp. Sensor timestamps identify the timing for alterations in power delivery to security sensor devices 512. Product timestamps identify the timing for alterations in power delivery to product devices 502. The sensor timestamps and product timestamps from various security sensor devices 512 and product devices 502 are then compared, e.g., by the server device 508, as described below. A particular security sensor device 512 is paired or registered with a particular product device 502 based on the comparison, e.g., when the respective timestamps match.

In the example of FIG. 5, power events occur when the product device 502 and the security sensor device 512 are lifted from or placed on the cradle 520. When lifted from the cradle 520, the security sensor device 512 no longer receives power via the power pins 522, 523. As a result, the power port 516 of the product device 502 no longer receives power via the cable 518. The respective timing of each power disconnection is thus the same (e.g., roughly the same). The respective timestamps will thus match. When placed on the cradle 520, the security sensor device 512 receives power via the power pins 522, 523. As a result, the product device 502 receives power via the power port 516 and the cable 518. The respective timing of each power connection is thus the same (e.g., roughly the same), and the timestamps will again match.

Timestamped data for each power event is provided to the server device 508 to associate, or register, a respective product device 502 with a respective security sensor device 512. For example, the timestamped data may be sent as a data package. The data package includes data identifying the device and the timestamp data. In the example shown, the identification data is or includes either sensor identification data or product identification data. Additional data may be included, including, for instance, position data regarding a display location or site of the device. The components, configuration, and other aspects of the timestamped data may vary from the example described above.

The security sensor device 512 is configured to generate and provide the timestamped data for each power event. In the example shown, the security sensor device 512 includes a microcontroller 524 and a memory 526. The microcontroller 524 may be or include one or more processors. The memory 526 may be or include one or more memories. The sensor identification data may be stored in the memory 526 and accessed by the microcontroller 524 to generate the timestamped data. The microcontroller 524 may be configured by instructions stored in the memory 526 or another memory, such as an internal memory. In the example of FIG. 5, when the power event occurs, the microcontroller 524 wirelessly communicates the sensor identification data stored in the memory 526 of the security sensor device 512 to the alarm control unit 504. A microprocessor 528 of the alarm control unit 504 then sends the data, including the sensor timestamp and the sensor power event information, to the server device 508 through the gateway 506.

The product device 502 is also configured to generate and provide the timestamped data for each power event. In the example shown, the product device 502 includes one or more processors 530 and one or more memories 532. The processor 530 may be configured to execute a service, application, or other procedure in accordance with instructions 534 stored in the memory 532. For instance, the instructions 534 may cause the processor 530 to monitor the power port 516 of the product device 502. When the power event occurs, execution of the instructions 534 causes the processor 530 to generate and send the timestamped data to the server device 508.

The product device 502 may send the timestamped data to the server device 508 via a different route than the security sensor device 512. For instance, the product device 502 may send the product timestamped data via a wireless local area network and/or cellular network communication link, rather than via the alarm control unit 504.

One or both of the data packages may include plan-o-gram or other position data. For example, the sensor data package may further include a unique cradle identifier for the cradle 520. In some cases, the cradle 520 includes circuitry 536 that sends the unique cradle identifier through the power pins 522, 523 to the security sensor device 512 when the security sensor device 512 is sitting on the cradle 520. The cradle identifier may be provided to the security sensor device 512 in additional or alternative ways, including, for instance, via a separate wired or wireless connection. The unique cradle identifier may include a retail display position, a plan-o-gram position, and/or a store identifier. Additionally or alternatively, the sensor data package may include a unique alarm control unit identifier. The unique alarm control unit identifier may include a retail display position, a plan-o-gram position, and/or the store identifier. Additionally or alternatively, the sensor data package may include a unique gateway identifier. The unique gateway identifier may include the location of the gateway 506 and/or the store identifier. The location of the gateway 506 may be obtained through cellular, GPS, and/or W-Fi network location services.

The manner in which the position data is added to one or both of the data packages may vary. In some cases, the position data is added to the sensor data package by the security sensor device 512 when sending the sensor data package. Alternatively, the position data is added to the sensor data package by the alarm control unit 504 and/or the gateway 506 after receiving the sensor data package from the security sensor device 512.

The position data may be obtained by the server device 508 separately or independently from the other identification data. For instance, position data for a respective security sensor device may be obtained via an identification of the respective gateway 506. Each gateway 506, in turn, is associated with a respective site location. In some cases, each gateway 506 sends its unique gateway identifier and data indicative of the security sensor devices 512 at its respective site location separately from other data packages. The site location and other position data may thus be obtained in ways in addition and/or alternative to the other data packages.

The server device 508 generates registration data based on the timestamped data. The timestamped data is received independently from the product device 502 and the security sensor device 512. As described above, the registration data associates or registers the security sensor device 512 and the product device 502. The server device 508 includes one or more processors 538 configured to generate the registration data. In this example, the server device 508 further includes database or other storage 540 in which the registration data is stored.

The server device further includes one or more memories 542. In the example shown, correlation instructions 544 and database management instructions 546 are stored in the memory 542. Execution of the correlation instructions 544 causes the processor 538 to scan the received data stored in the database storage 540 for timestamp matches. If a match, or multiple matches are found, registration data associating the sensor identification data to the product identification data is automatically generated by the processor 538. The registration data thereby associates the corresponding security sensor device 512 and product device 502 having the matching timestamps with one another. After the security sensor device 512 and the product device 502 are associated, execution of database management instructions 546 cause the processor 538 to store the registration data in the storage 540.

If the timestamped data includes position data, the registration data also associates the cradle 520, the alarm control unit 504, the gateway 506, or other positional data with the security sensor device 512 and the product device 502.

Figure 6:
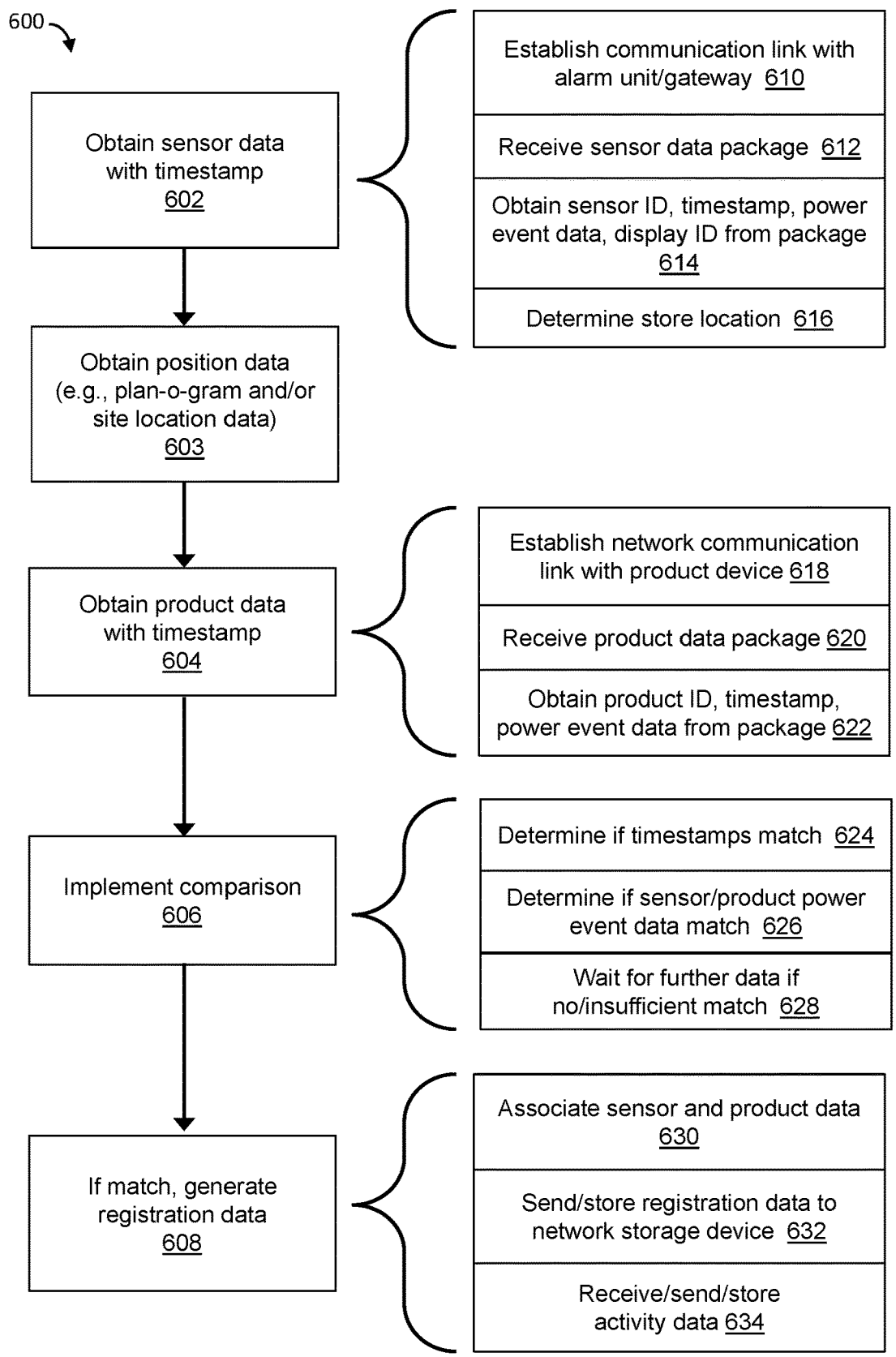
FIG. 6 is a flow diagram of a method of timestamp-based, automatic registration of security sensor devices, product devices, and product display locations in accordance with one example.

FIG. 6 is a flow diagram of a method 600 of registering a security sensor device with a product device to be protected via the security sensor device. The method 600 may be implemented by one or more processors, such as the processor 538 of the server device 508 (FIG. 5). Additional or alternative processors may implement the method 600.

The method 600 includes an act 602 in which sensor data (e.g., sensor identification data) is obtained for the security sensor device. The sensor data identifies the security sensor device and includes a timestamp for an alteration in power delivery to the security sensor device. The alteration in power delivery to the security sensor device involves or includes a power connection or disconnection between the security sensor device and a display location via which power is delivered to the security sensor device.

The security sensor device may be one of the security sensor devices described hereinabove. The sensor data may be received from different sources or otherwise captured, acquired, or determined. In some cases, the security sensor device obtains the sensor identification data from a memory of the security sensor device.

In the example of FIG. 6, position data for the sensor-product combination is obtained in an act 603. The position data may be indicative of a display location, such as the location of a cradle, stand, base, or other display fixture, and/or a site location, such as a retail site. The position data may be or include plan-o-gram data, as described above. The position data may be obtained via an IP gateway and/or other devices at the site. In some cases, the position data may be sent via a dedicated data package or other communication separate and independent from other data packages. Additionally or alternatively, one or more types of position data may be obtained in conjunction with the other identification data, such as the sensor data. For instance, plan-o-gram and/or other position data may be integrated with the sensor identification data in a sensor data package.

Product data (e.g., product identification data) is obtained in an act 604 for the product device protected by the security sensor device. The product device and the security sensor device may thus be associated or registered with one another. The product data identifies the product device and includes a product timestamp for an alteration in power delivery to the product device. The product data may identify the product device in one or more ways. For instance, the product data may be indicative of a product name and/or product model. Alternatively or additionally, the product data may be indicative of a serial number, IMEI number, and/or other data indicative of a particular instance of the product device. The product data may be received as a product data package including product identification data and product power event data. The product power event data is indicative of an alteration in delivery of power to the product device.

The manner in which the product identification data is obtained in the act 604 may vary. The product data may be received from different sources or otherwise captured, acquired, or determined. In some cases, the product device obtains the product identification data from a memory of the product device.

The method 600 includes an act 606 in which a comparison of the sensor timestamp and the product timestamp is implemented. The comparison may be part of a procedure in which successive attempts to match timestamps are implemented. For example, a particular product timestamp may be compared with a plurality of sensor timestamps until a match is found or a predetermined amount of time has elapsed, e.g., since the time indicated on the timestamp. Alternatively or additionally, a particular sensor timestamp may be compared with a plurality of product timestamps until a match is found or a predetermined amount of time has elapsed.

The method 600 includes an act 608 in which registration data is generated for the combination of the security sensor device and the product device. The registration data is generated based on the comparison of the respective timestamps. For example, the registration data associates a security sensor device and a product device having matching timestamps. The registration data may also associate the devices with position data, such as the location of the product display and/or a site location.

The act 608 may include other processing of the registration data. For example, in some cases, the registration data is processed with other data, such as activity data indicative of activity involving the product device and/or the security sensor device. For instance, the activity data may be indicative of consumer interaction with the product device and/or indicative of alarm or other status data provided by the security sensor device.

FIG. 6 depicts a number of examples of the acts 602, 604, 606, and 608. Each act is addressed separately below.

The sensor data may be obtained in the act 602 in a variety of different ways in an act 610. In some cases, the sensor data is sent to the server device for storage of the sensor data in a database. The act 610 may include establishing a communication link for sending the sensor data within a networked computing architecture, such as via an alarm unit and/or an IP gateway as described above. The alarm unit and/or the IP gateway may be located at a site in which the product device is located. Alternatively or additionally, the sensor data may be sent from a security sensor device or a product device.

Alternatively or additionally, the sensor data in the act 602 may be received in a variety of different forms in an act 612. In some cases, the sensor data may be received as a sensor data packet that includes sensor identification data and sensor power event data. The sensor data packet may include additional data, such as position data, e.g., display location data and/or site location data. The sensor power event data is indicative of whether the alteration in power delivery involves either a start or an end of power delivery to the security sensor device. The display location or other position data is indicative of a location of a product display in which the product device is displayed. For example, the position data may identify a cradle configured to receive the security sensor device, and/or the display location identifies a plan-o-gram position of the location of the product display. The plan-o-gram position is a physical position that defines where each sensor and/or product are placed in the store. The site location is indicative of a site in which the product display is located. Alternatively or additionally, a store location is determined from the sensor data that includes site location data that is indicative of a site in which the product display is located, in an act 616.

The product data may be obtained in the act 604 in a variety of different ways in an act 618. In some cases, the product data is sent to the server device for storage of the product data in the database. The act 618 may include establishing network communication for sending the product data from the product device 502, as described above.

Alternatively or additionally, the product data in the act 602 may be received in a variety of different forms in an act 620 via a service or application executing on the product device. The product data may be received as a product data packet that includes product identification data and product power event data in an act 622. The product power event data is indicative of whether the alteration in power delivery involves either a start or an end of power delivery to the product device.

The comparison of the sensor timestamp and the product timestamp may be implemented in the act 606 in a variety of different ways. The implementing of the comparison may include determining whether the sensor timestamp and the product timestamp match in an act 624. The implementation of the comparison may include determining whether both the sensor power event data and the product power event data match regarding whether the alteration in power delivery involves either a start or an end of power delivery in an act 626. The comparison may be implemented by the processor of the server device 508, as described above, via the execution of correlation instructions to determine whether both the sensor power event data and the product power event data match. Additionally or alternatively, the comparison may be continuously implemented until an exact match or a match within a threshold occurs in an act 628.

The generation of the registration data in the act 608 may include associating the sensor data and the product data if the comparison reveals that the sensor timestamp and the product timestamp match or sufficiently match regarding whether the alteration in power delivery involves either a start or an end of power delivery in an act 630. Additionally or alternatively, the registration data may associate the display location data and/or the site location data with the security sensor device and the product device. The respective data may be obtained as described above. The processor of the server device 508 may execute correlation instructions to generate the registration data as described above.

The registration data may then be forwarded or otherwise transmitted. In some cases, the registration data is sent in an act 632 to a storage device (e.g., a network storage device) for storage of the registration data in a registration database. The processor of the server device 508 may execute database management instructions to store the registration data in the storage device as described above.

The generation of the registration data may also include sending, receiving, and/or storing other types of data in conjunction with the registration data in an act 634. For example, activity data may be received from the security sensor device. The activity data may be indicative of activity detected by the security sensor device, such as the amount of times the product device is picked up by a customer. In some cases, the activity data is indicative of consumer interaction with the product device, such as the amount of times the product device is picked up by a customer. Other types of activities involving the product device may also be tracked via the activity data, including, for instance, alarm and other status data. The act 634 may then include storing the activity data in the database in which the registration data is stored to associate the activity data with the product device.

The order of the acts of the method 600 may differ from the example shown in FIG. 6. For instance, the position data and/or the product identification data may be obtained before or concurrently with the sensor identification data.

The method 600 may include additional, fewer, or alternative acts. For instance, the method 600 may include an act in which the identification data for a product device or other system component is changed. In one example, a product device updates its own identification information to a new name and/or number upon scanning or other reading. For instance, a temporary name is assigned whenever the product device is placed upon an NFC tag or reader, and/or a product display cradle or base. The name may then be changed back, e.g., to a default name, upon removal from that location.

The above-described registration methods and systems may help to avoid user error in recording the pairings and other associations in a retail environment. Further user error may be avoided in cases in which product display location may be part of the registration data. The registration data may allow a user to determine if product positions have changed. Still other uses of the registration data may be supported. For example, stock-out compliance may be supported by periodically obtaining the product display location information.

Figure 7:
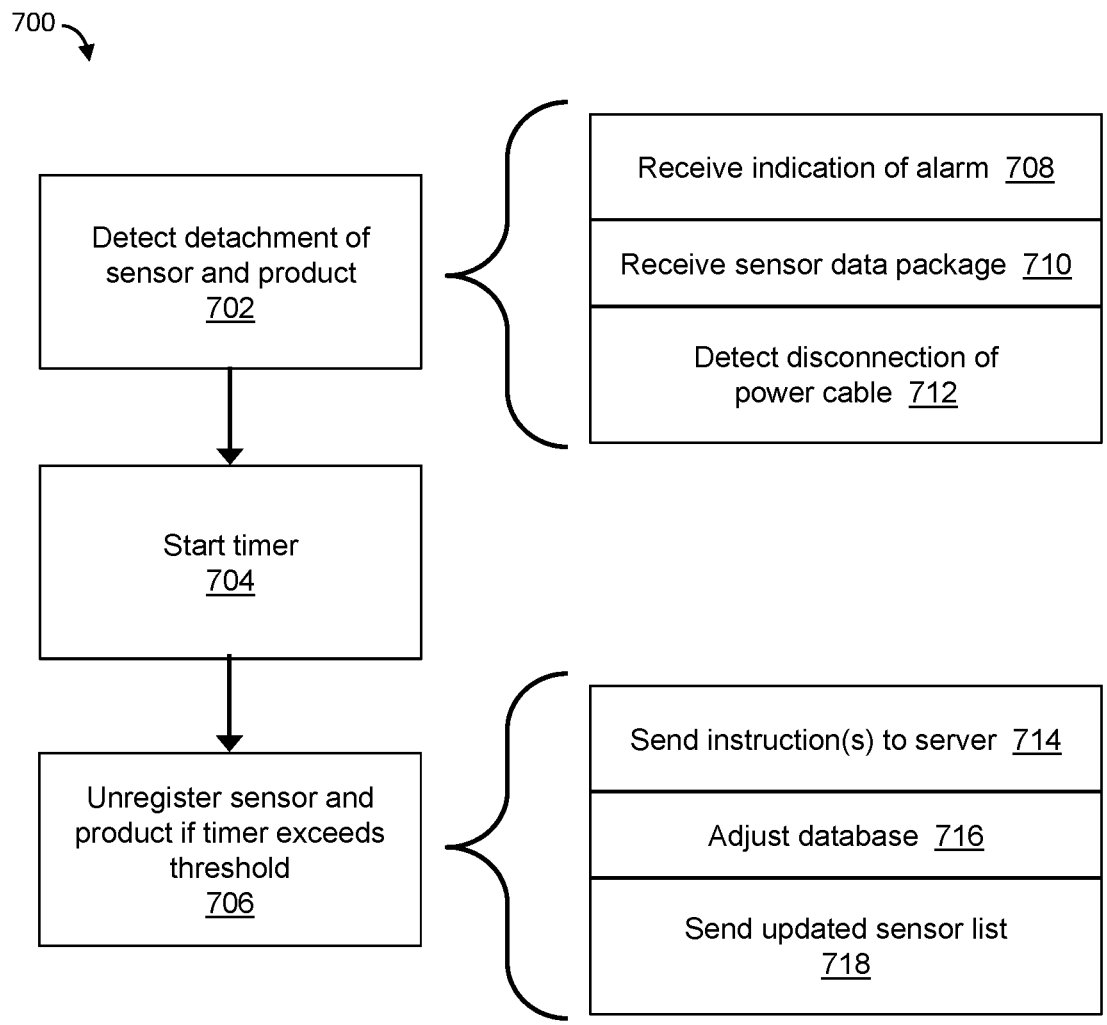
FIG. 7 is a flow diagram of a method of automatic un-registration of security sensor devices, product devices, and product display locations in accordance with one example.

FIG. 7 depicts a method 700 for un-registration of security sensor devices and product devices. The method 700 may be implemented after a security sensor device and a product device have been associated with one another. The method 700 may provide an automatic way to un-pair or otherwise un-register the security sensor device and the product device. Security sensor devices and product devices may be disassociated or un-registered in additional or alternative ways, including, for instance, manual and other adjustments to the data stored in or by a network storage device.

The method 700 may be implemented by one or more of the processors described herein. In some cases, the processor of an alarm control unit or other on-site device, such as an IP gateway, implements the method 700. Alternatively, the processor of a server control device implements the method 700. In still other cases, a combination of processors implements the method 700.

In the example of FIG. 7, automated un-registration may begin with detection of the detachment of the security sensor device and the product device in an act 702. For example, an alarm control unit may detect the detachment. In some cases, the detachment may be detected first by the sensor device itself, after which a message is sent by the sensor device to the alarm control unit. The detection may thus involve more than one step or act, and may be indirect or direct. In other cases, additional or alternative trigger events may be detected in the act 702. For example, the disassociation of the security sensor device and the product device may be initiated by the selection of an option on the product device and/or security sensor device.

Once the detachment or other event is detected, a timer is started in an act 704. The nature of the timer may vary. For instance, the timer may be a count-up or count-down timer. The timer may or may not be tracking elapsed time. For instance, the timer may instead track a number of cycles of a routine being implemented by the processor. Still other timers or timing indications may be used.

In an act 706, the security sensor device and the product device are un-paired or otherwise un-registered once the timer exceeds a threshold. For example, the un-registration occurs when the timer exceeds a predetermined time limit, e.g., 30 seconds. Alternative or additional conditions may be used. For example, the un-registration may be dependent upon exceeding the threshold while an alarm condition is not active.

FIG. 7 depicts a number of optional acts for each act 702, 704, 706, of the un-registration method 700. The detection of the detachment may include receiving or otherwise obtaining an indication of an alarm in an act 708. For example, a server device or alarm control unit may receive a message regarding an alarm condition. In this case, a store employee may have detached the product device before remembering to deactivate the alarm or otherwise disarm the security sensor device. Alternatively or additionally, the act 702 includes or involves receiving or otherwise obtaining in an act 710 a data package from the security sensor device regarding the detachment or other event warranting the un-registration. The detachment or other event may be detected in still other ways, including, for instance, detection of the power cable disconnection directly in an act 712.

The un-registration of the act 706 may vary in several respects. For instance, the act 706 may or may not include sending one or more instructions to a server device in an act 714. The instruction(s) to un-register may be sent by the security sensor device, the alarm control unit, and/or the IP gateway. Alternatively, the un-registration may be directly implemented in an act 716 in which, for instance, a database is adjusted. The un-registration may include or involve any number of additional or alternative acts, including, for instance, an updated list of active security sensor devices being sent or received in an act 718. The removal of a respective one of the security sensor devices from the list may then be used by the server device or other processor to un-register any devices or positions from the respective sensor security device.

The method 700 may include fewer, additional, or alternative acts. For instance, the method 700 may include one or more acts directed to attempting to pair or otherwise associate a detached security sensor device with a different product device.

In some cases, one or more of the automated aspects of the above-described registration methods and systems of FIGS. 5-7 may be combined with one or more of the manual aspects of the methods and systems of FIGS. 1-4. For instance, in some cases, timestamps may still be used to associate or register sensor and product devices with one another, but a scanner, such as a scanner provided by the product device, may be used to gather identification data, such as product identification data and/or position data. Such gathering may be useful in preparing data to be sent to the server device. Manual and automated registration procedures may be integrated or combined in alternative or additional ways. For example, the un-registration method 700 of FIG. 7 may be supplemented by user-initiated or user-implemented requests for un-registration or disassociation made via one or more user interfaces provided at the alarm control unit, the server device, and/or another system component.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A method of registering a security sensor device with a product device to be protected via the security sensor device, the method comprising:
    obtaining, by a networked computing device, sensor data identifying the security sensor device and comprising a sensor timestamp for an alteration in power delivery to the security sensor device;
    obtaining, by the networked computing device, product data identifying the product device and comprising a product timestamp for an alteration in power delivery to the product device;
    implementing, by the networked computing device, a comparison of the sensor timestamp and the product timestamp; and
    generating, by the networked computing device, registration data for the security sensor device and the product device based on the comparison, the registration data associating the security sensor device and the product device.

2. The method of claim 1, wherein the alteration in power delivery to the security sensor device comprises a power connection or disconnection between the security sensor device and a display location via which power is delivered to the security sensor device.

3. The method of claim 1, further comprising obtaining, by the networked computing device, position data indicative of a location of a product display in which the product device is displayed, wherein the registration data further associates the position data with the security sensor device and the product device.

4. The method of claim 3, wherein the position data comprises display location data, the display location data identifying a cradle configured to receive the security sensor device.

5. The method of claim 3, wherein the position data identifies a plan-o-gram position of the location of the product display.

6. The method of claim 3, wherein:
    the position data comprises site location data indicative of a site in which the product display is located; and
    the registration further associates the site location data with the security sensor device and the product device.

7. The method of claim 1, wherein:
    the sensor data and the product data comprise sensor power event data and product power event data indicative of the alteration in power delivery to the security sensor device and the product device, respectively;
    the sensor power event data is indicative of whether the alteration in power delivery involves either a start or an end of power delivery to the security sensor device; and
    the product power event data is indicative of whether the alteration in power delivery involves either a start or an end of power delivery to the product device.

8. The method of claim 7, wherein implementing the comparison comprises determining whether both the sensor power event data and the product power event data match regarding whether the alteration in power delivery involves either a start or an end of power delivery.

9. The method of claim 1, wherein:
    implementing the comparison comprises determining whether the sensor timestamp and the product timestamp match; and
    generating the registration data comprises associating the sensor data and the product data if the comparison reveals that the sensor timestamp and the product timestamp match.

10. The method of claim 1, wherein:
    obtaining the sensor data comprises receiving a sensor data package comprising sensor identification data and sensor power event data; and
    obtaining the product data comprises receiving a product data package comprising product identification data and product power event data.

11. The method of claim 1, wherein obtaining the sensor data comprises receiving a sensor data package from the security sensor device via an alarm control unit at a site in which the product device is located.

12. The method of claim 1, wherein obtaining the product data comprises receiving a product data package from the product device via a service executing on the product device.

13. A method of registering a security sensor device with a product device to be protected via the security sensor device, the method comprising:
   obtaining, by a networked computing device, a sensor data package comprising sensor identification data and sensor power event data, the sensor power event data being indicative of an alteration in delivery of power to the security sensor device;
   obtaining, by the networked computing device, position data indicative of a location of a product display in which the product device is displayed;
   obtaining, by the networked computing device, a product data package comprising product identification data and product power event data, the product power event data being indicative of an alteration in delivery of power to the product device;
   implementing, by the networked computing device, a comparison of respective timestamps of the sensor power event data and the product power event data; and
   if the respective timestamps match, generating, by the networked computing device, registration data for the security sensor device and the product device based on the sensor identification data and the product identification data, the registration data associating the security sensor device, the location of the product display, and the product device.

14. The method of claim 13, wherein:
   implementing the comparison comprises determining whether both the sensor power event data and the product power event data match regarding whether the alteration in power delivery involves either a start or an end of power delivery; and
   the registration data is generated if the sensor power event data and the product power event data match regarding whether the alteration in power delivery involves either a start or an end of power delivery.

15. The method of claim 13, wherein generating the registration data comprises sending the registration data to a network storage device for storage of the registration data in a registration database.

16. The method of claim 15, further comprising storing, in the registration database, customer interaction data in association with the registration data, the customer interaction data involving a customer interaction with the product device.

17. A networked computing device for registration of a security sensor device and a product device to be protected by the security sensor device, the networked computing device comprising:
   a processor;
   a memory in which correlation instructions and database management instructions are stored for execution by the processor;
   a storage device configured to store registration data associating the security sensor device and the product device;
   wherein the processor is configured via the execution of the correlation instructions to—
      obtain, from the security sensor device via a first network communication, a sensor data identifying the security sensor device and comprising a sensor timestamp for an alteration in power delivery to the security sensor device,
      obtain, from the product device via a second network communication, product data identifying the product device and comprising a product timestamp for an alteration in power delivery to the product device,
      implement a comparison of the sensor timestamp and the product timestamp, and
      generate the registration data for the security sensor device and the product device based on the comparison; and
   wherein the processor is configured via the execution of the database management instructions to store the registration data in the storage device.

18. The networked computing device of claim 17, wherein the processor is further configured via the execution of the correlation instructions to—
   obtain position data indicative of a location of a product display in which the product device is displayed; and
   generate the registration data such that the registration data associates the location of the product display with the security sensor device and the product device.

19. The networked computing device of claim 18, wherein the position data identifies a Plan-o-gram position of the location of the product display.

20. The networked computing device of claim 17, wherein:
   the sensor data and the product data comprise sensor power event data and product power event data indicative of the alteration in power delivery to the security sensor device and the product device, respectively;
   the sensor power event data is indicative of whether the alteration in power delivery involves either a start or an end of power delivery to the security sensor device;
   the product power event data is indicative of whether the alteration in power delivery involves either a start or an end of power delivery to the product device; and
   the processor is further configured via the execution of the correlation instructions to determine whether both the sensor power event data and the product power event data match regarding whether the alteration in power delivery involves either a start or an end of power delivery.

* * * * *